June 29, 1954  A. S. DAVIS, JR  2,682,314
WET BOTTOM PRECIPITATOR

Filed Oct. 30, 1952  4 Sheets-Sheet 1

INVENTOR
ALBERT S. DAVIS JR
BY Harold T. Stowell
ATTORNEY

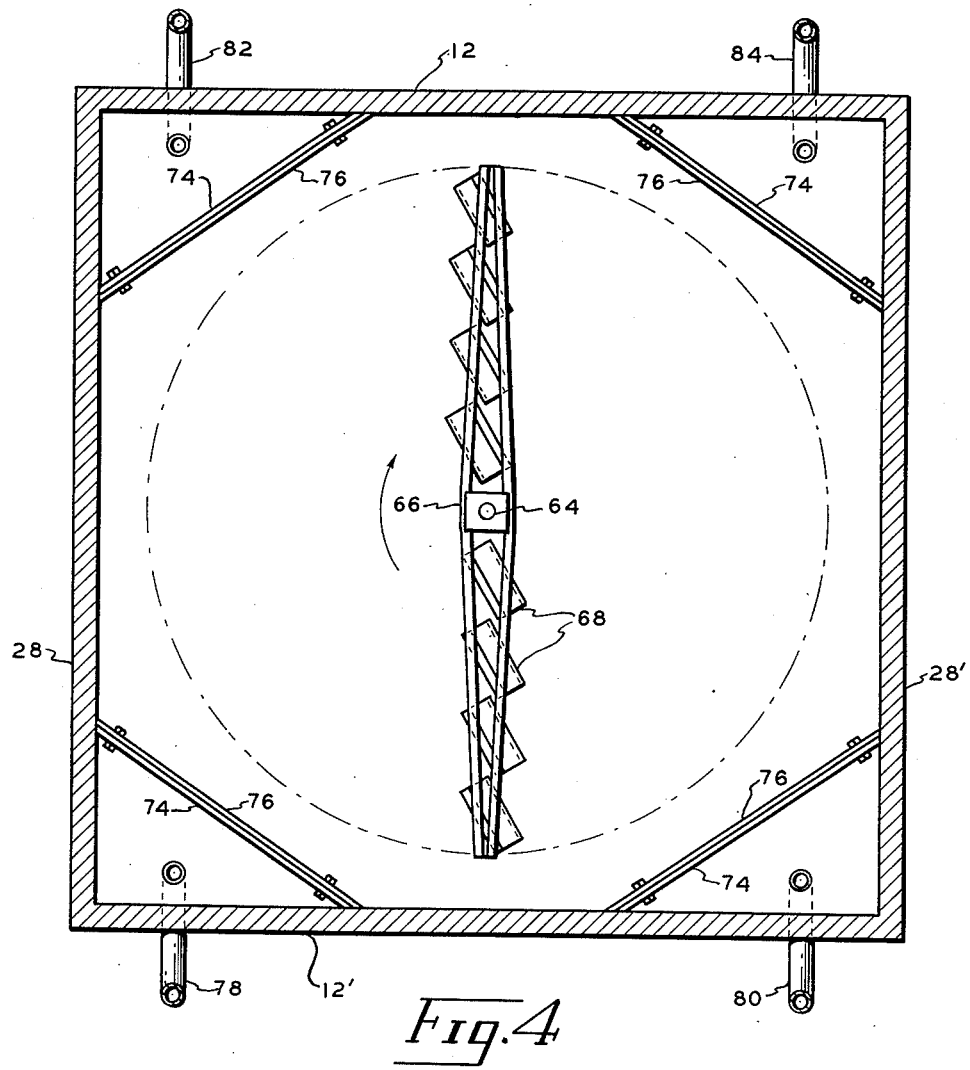

Patented June 29, 1954

2,682,314

UNITED STATES PATENT OFFICE 2,682,314

WET BOTTOM PRECIPITATOR

Albert S. Davis, Jr., Somerville, N. J., assignor to Research Corporation, New York, N. Y., a corporation of New York Application October 30, 1952, Serial No. 317,788

3 Claims. (Cl. 183—7)

This invention relates to an improved electrical precipitator particularly adapted to the efficient collection of material suspended in the gases from paper pulp waste liquor recovery furnaces.

In the removal of suspended ash consisting essentially of finely divided sodium sulphate from the exhaust gases of waste liquor recovery furnaces in the paper pulp industry the use of wet bottom precipitators has proved very successful. In general, the suspended material borne by the gases from the recovery furnace is precipitated on the collecting electrodes of the electrical precipitator in the form of a dry powder deposit. The precipitated ash is preferably removed from the surface of the electrodes of the precipitator by rapping means and the ash thus removed falls into a sump formed in the lower zone of the precipitator shell. A pool of weak black liquor is maintained in the sump and is continuously stirred by means of a mechanical agitator. The precipitated ash is dissolved in the weak black liquor to increase its concentration of dissolved solids. When the fortified black liquor in the sump has reached the prescribed concentration some of the liquor is drawn off and conducted to a suitable storage tank. Simultaneously the sump is replenished with weak black liquor to maintain the pool level substantially constant. The withdrawal of concentrated liquor and the supply of weak liquor may be effected continuously.

While the above described process has proved very successful, it has been found that the precipitated ash has a tendency to deposit about the walls of the pool. This is caused directly by falling dry powder from the collecting electrodes and indirectly by the separation of the salt cake ash from the black liquor in the pool, and from the tendency of the agitator to cause the undissolved salt cake ash to collect at the outer extremities of the agitator blades. When the build-up of salt cake becomes excessive, arc-overs between the high tension electrodes and the precipitator shell occur, substantially reducing the efficiency of the unit.

It is therefore a primary object of the invention to provide an improved wet bottom precipitator having a flared base portion defining a sump to receive the collected material and provided with a rotary agitator whereby the build-up of collected material about the walls of the precipitator shell is substantially eliminated.

A further object is to provide such a device wherein all of the electrodes of the precipitator can be located above the collecting pool.

Another object is to provide such a device wherein the mechanical agitator is of sufficient diameter to agitate the pool, under substantially the total electrode area, and wherein rate of rotation of the agitator is sufficiently low to substantially eliminate objectionable foaming.

These and other objects and advantages will be apparent from the following detailed description of the invention with reference to the accompanying drawings, wherein;

Fig. 4 is a plan view of the device on line 4—4 of Fig. 2.

Figure 1:
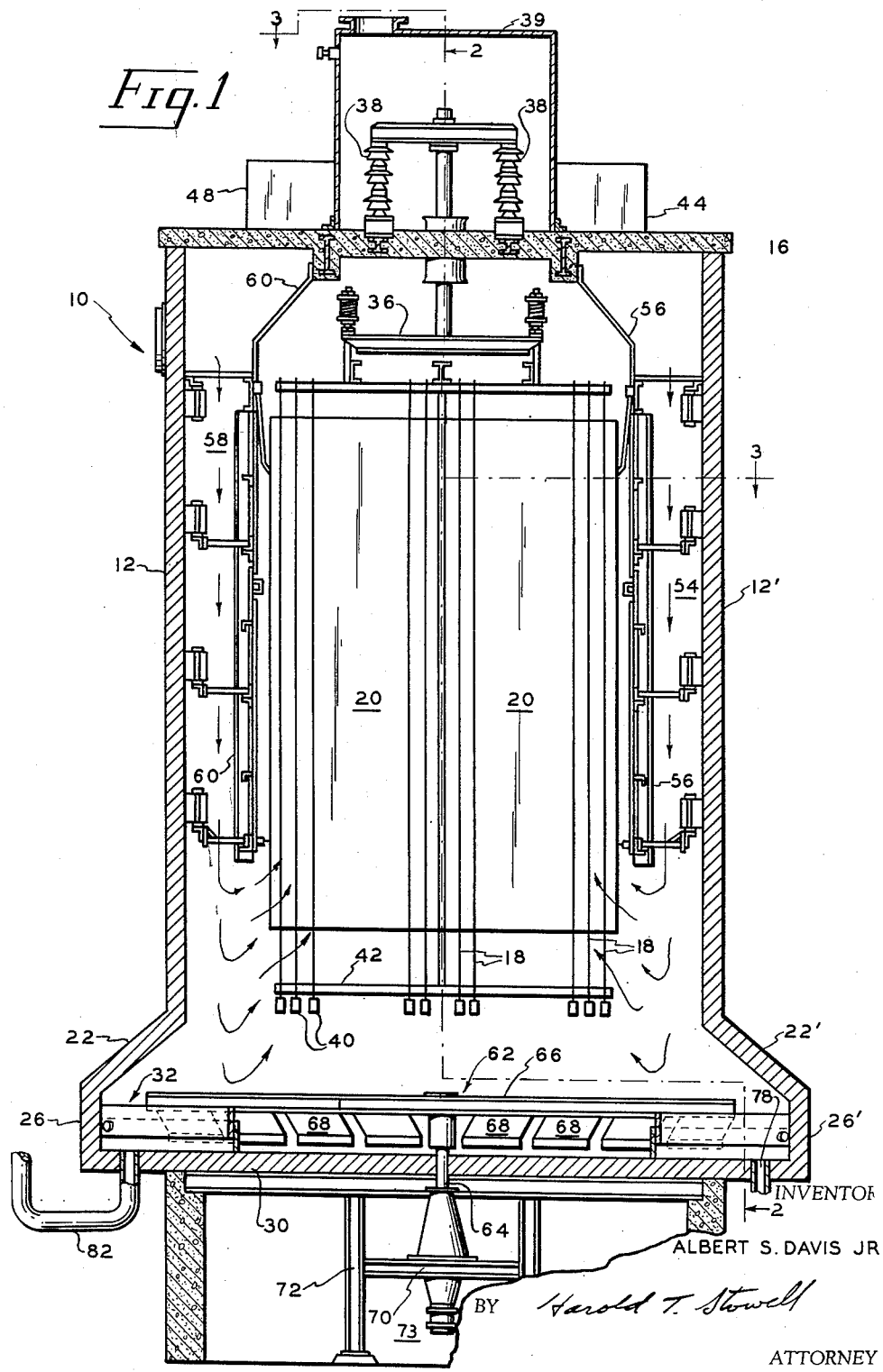
Fig. 1 is an elevational view of the improved electrical precipitator of the invention on line 1—1 of Fig. 2.
Figure 2:
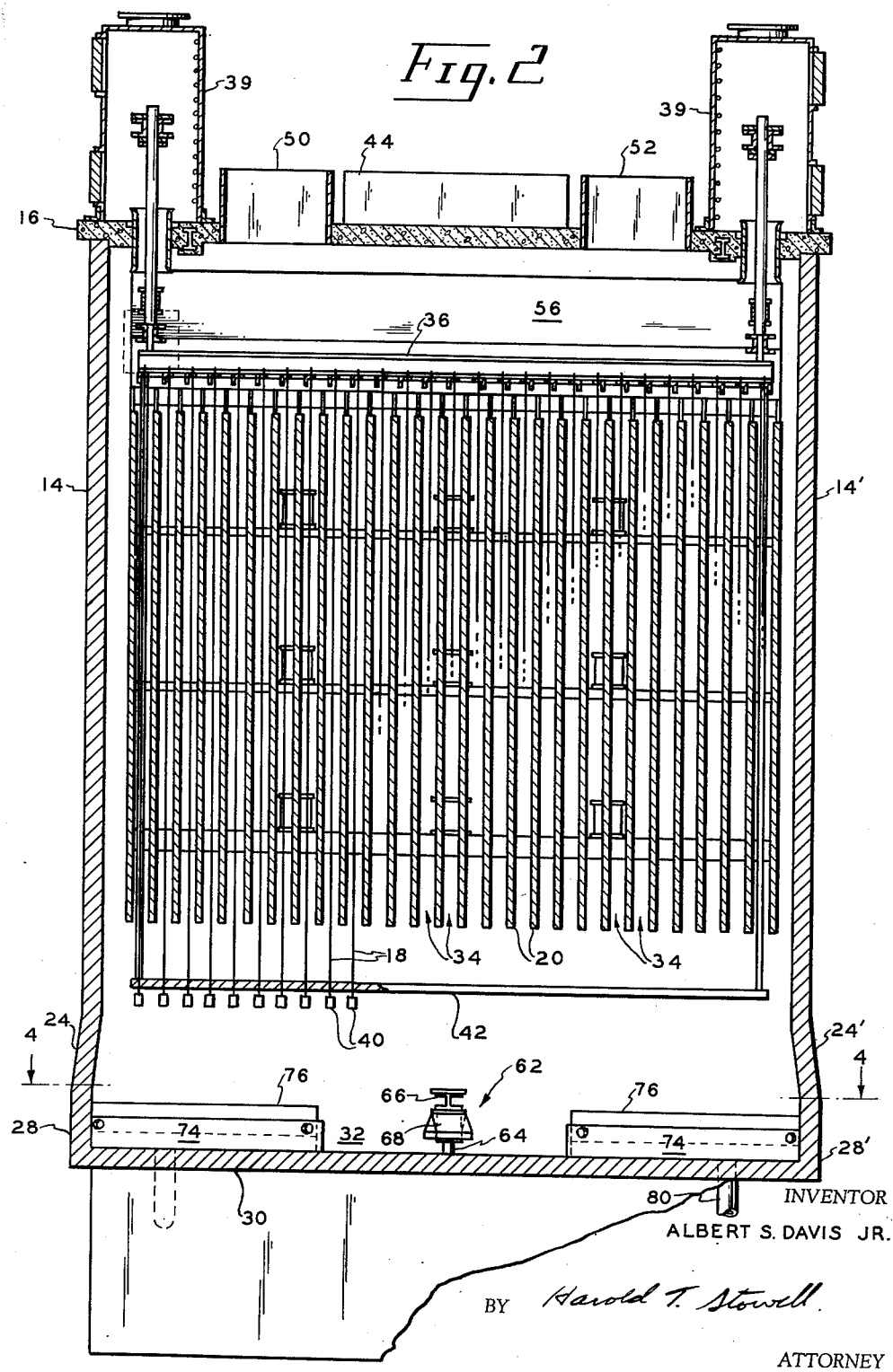
Fig. 2 is an elevational view on line 2—2 of Fig. 1.

The invention will be described with particular reference to wet bottom precipitators adapted to be used in collecting sulphate ash, however, it will be apparent that the improved precipitator of the invention may be very successfully employed in the collection of other types of liquid-soluble suspended particles from gas streams.

In the drawings 10 is an electrical precipitator having a precipitation portion and a sump portion. The precipitator portion is provided with substantially vertical side walls 12 and 12' and 14 and 14' and a horizontal roof portion 16. This portion of the precipitator generally includes complementary discharge electrodes 18, and extended surface electrodes 20 through which the gases to be cleaned pass and wherein the suspended material borne by the gases is precipitated upon the extended surface electrodes 20 in the form of a dry powdery deposit. At the lower extremity of the precipitation portion the side walls 12, 12', 14 and 14' are flared generally outwardly to form downwardly sloping wall portions 22, 22', 24 and 24' respectively. The lower ends of sloping wall portions 22, 22', 24 and 24' have generally vertical lower end portions 26, 26', 28 and 28' respectively which are jointed to the bottom 30 of the precipitator to form a sump 32 having a surface area substantially greater than that of the precipitator portion of the device. The sump 32 contains a relatively shallow pool of weak black liquor to be fortified. The entire shell of the precipitator may be formed of any suitable material of construction such as masonry or steel and may be lined with ceramic material to provide a corrosion resistant interior.

The vertically collecting plate electrodes 20 are supported in parallel, horizontally spaced relation in the precipitation zone to provide a plurality of vertically extending gas conduits 34 therebetween. The usual fine wire or other discharge electrodes 18 are suspended between plate electrodes 20 from an insulated framework 36 supported on insulators 38, housed in separate compartments 39. The lower ends of the fine wire electrodes are provided with tensioning weights 40 and a spacer frame 42.

In the top of the precipitator are dirty gas inlets 44 and 46 and clean gas outlets 50 and 52.

Gas inlet 44 communicates with gas passage 54 which is separated from the precipitator zone by baffle member 56 to provide an internal gas passage along the inside of vertical wall 12'. Gas inlet 48 communicates with a similar gas passage 58 which is formed by baffle member 60 and vertical wall 12. The baffle members 56 and 60 terminate at their lower ends just above the bottom of the collecting plate electrodes.

The gas outlets 50 and 52 each communicate with the space above the electrodes and between the upper ends of baffles 56 and 60.

The electrodes 18 and 20 and the baffle members 56 and 60 may be provided with conventional vibrators or rapper bars not shown in the drawings to aid in the removal of collected material therefrom.

Figure 3:
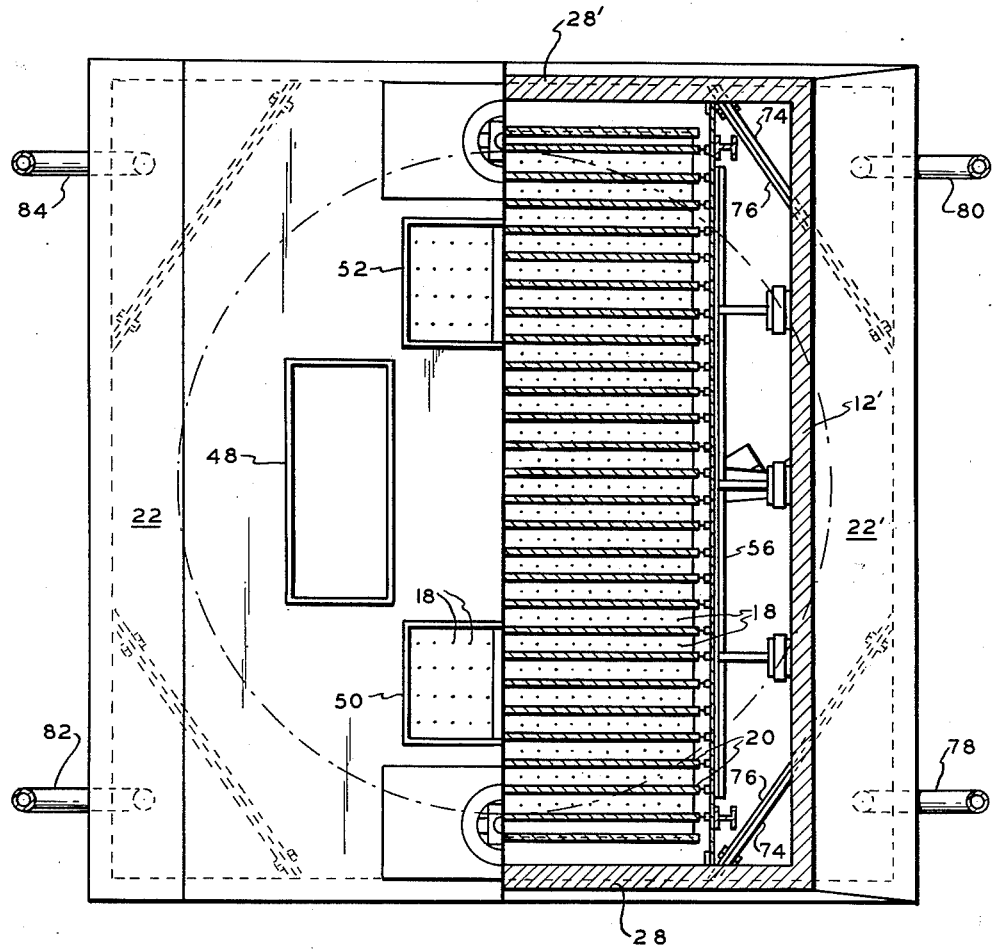
Fig. 3 is a plan view of the apparatus on line 3—3 of Fig. 1.

As is more clearly shown in Fig. 3 of the drawing the sump 32 formed by the lower flared sides of the precipitator shell is generally rectangular in cross section and extends laterally beyond the superposed precipitation zone so that collected material falling from the electrodes 18 and 20 or the baffle members 56 and 60 will collect in the sump in spaced relation to the side members 12, 12', 14 and 14' of the precipitation zone.

Centrally positioned within the sump is an agitator generally designated 62. The agitator has a vertical shaft 64 extending from below the bottom of the precipitator. The upper end of the shaft terminates above the normal level of the liquid in the sump. The shaft 64 carries a cross-arm 66 centrally mounted thereon. A plurality of agitator blades 68 depend from the arm 66 into the pool of liquor. The arm 66 is of a sufficient length to extend substantially under the entire precipitation zone and the blades 68 are mounted at such an angle on the arm 66 that they tend to force the liquid outwardly and into the corners of the sump as the agitator is rotated in the direction of the arrows shown in Fig. 4, thereby insuring thorough and efficient agitation.

The shaft 64 is carried in bearings 70 mounted in the frame-work 72 beneath the precipitator. At the lower end of bearings 70 is provided a pulley 73 through which the shaft is rotated by a suitable motor and belt not shown in the drawings.

The sump is provided with a pair of inlet conduits 78 and 80 and a pair of outlet conduits 82 and 84.

Each conduit is positioned in one of the corners of the precipitator and communicates with the bottom of the sump. Extending across the corners of the sump are weir dams 74, having adjustable flash boards 76 which as more clearly shown in Fig. 4 of the drawings separate the liquid inlet and outlet conduits from the main portion of liquid pond. Thus, the adjustable dams control the height of the liquid in the pond, and aid in preventing the collection and build-up of undissolved salt cake ash in the corners of the sump.

Automatic or manually controllable valve means not shown in the drawings may be connected in the liquid inlet conduits 78 and 80. Where conventional automatic control devices are employed the controllers are set to maintain a constant preselected rate of flow of liquid across the pond, which may be variously adjusted in accordance with the rate of dropping of precipitated material from the precipitator into the pool of liquor in the sump.

In operation of the improved wet bottom precipitator gases carrying liquid-soluble suspended particles enters the precipitator through inlets 44 and 48 and flows downwardly within the internal gas passages 54 and 58.

At the lower end of baffle members 56 and 60 the gas reverses direction and flows upwardly through the gas treating passages 34. Some of the suspended material is collected on baffles 56 and 60 and some is thrown from the gas stream as it changes direction at the lower end of the baffles. The remainder of the suspended material is collected on the extended surface electrodes 20. Upon rapping the electrodes and the baffles 56 and 60 the collected material falls into the pool of liquid maintained in an agitated condition in sump 32. Substantially all of the collected material will fall within the active field of the agitator 62 as the sump 32 extends laterally further than the side walls of the precipitator shells in the precipitation zone. Rotation of the agitator brings the pool liquid into contact with the precipitated material while the sloping side walls of 22, 22', 24 and 24' substantially eliminates build-up of the undissolved material on the walls of the sump while the weir dams 74 prevent undissolved material from collecting in the corners thereof.

From the foregoing description it will be seen that the present invention provides an improved wet bottom precipitator whereby the arms, objects and advantages of the invention are fully accomplished.

I claim:

1. An electrical precipitator comprising a housing having generally vertically disposed side walls defining a precipitation zone, the lower ends of the side walls being flared generally outwardly and downwardly to form a sump directly below the precipitation zone having a substantially greater areal extent than the horizontal area of the precipitation zone, a bottom for said sump, complementary precipitating and collecting electrodes in the precipitation zone constructed and arranged to deliver precipitated material by gravity to the sump, means for directing a stream of liquid across the sump, and agitator means in said sump.

2. An electrical precipitator as defined in claim 1 including weir means separating the inlet and outlet means in the sump portion.

3. An electrical precipitator comprising a generally rectangular housing having vertically disposed side walls defining a precipitation zone, the lower ends of the side walls being flared generally outwardly and downwardly and connected to a base member to form a sump directly below the precipitation zone having a substantially greater areal extent than the horizontal area of the precipitation zone, complementary precipitating and collecting electrodes in the precipitation zone constructed and arranged to deliver precipitated material by gravity to the sump, means forming a liquid pool in said sump comprising weir means across the corners of the sump and liquid inlet and outlet means in adjacent corners of the sump behind said weir means, and agitator means in said sump.

References Cited in the file of this patent

UNITED STATES PATENTS

| Number | Name | Date |
| --- | --- | --- |
| 2,268,475 | Darby | Dec. 30, 1941 |
| 2,603,307 | Richardson | July 15, 1952 |